Aug. 19, 1952    C. MARSHALL    2,607,907
ELECTRONIC TIMING DEVICE
Filed July 3, 1950
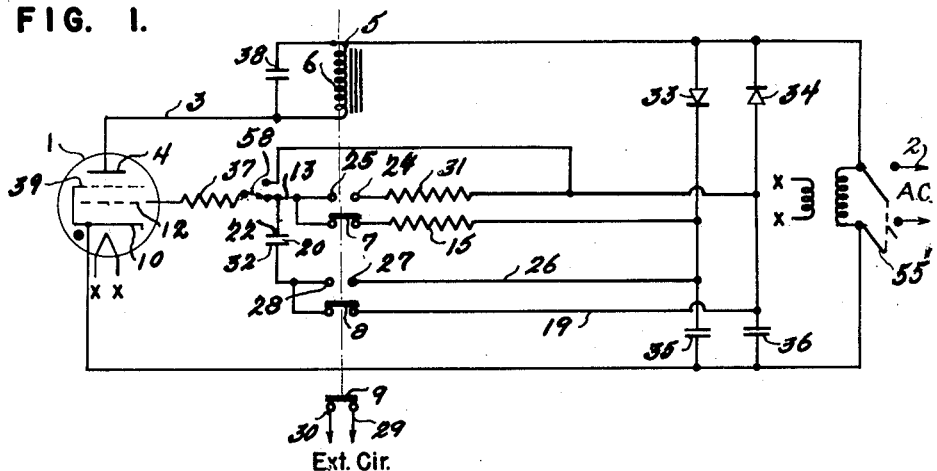
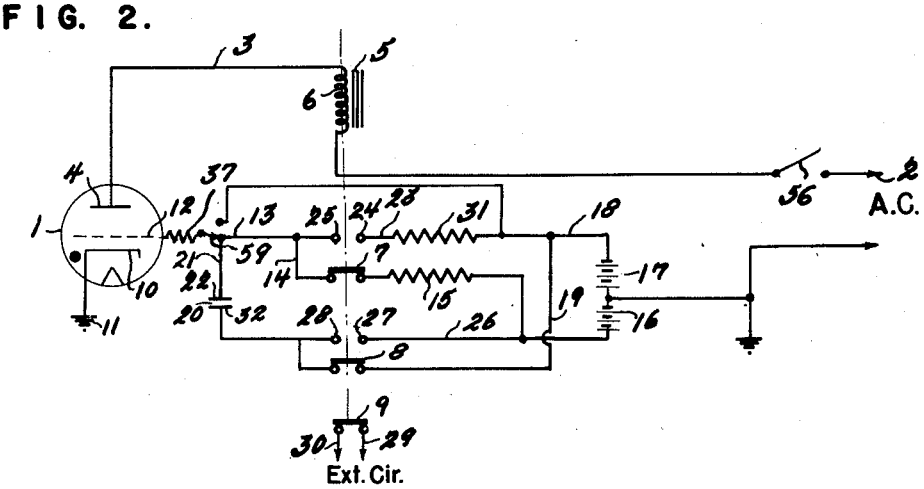
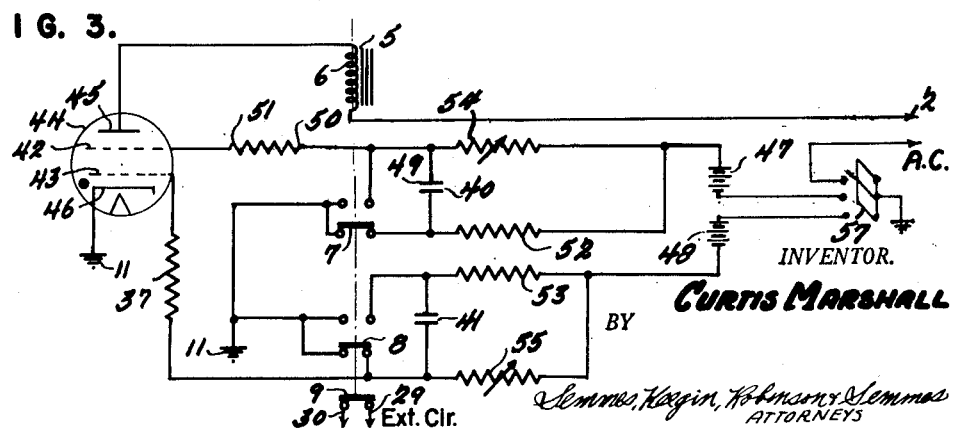

Patented Aug. 19, 1952

2,607,907

UNITED STATES PATENT OFFICE 2,607,907

ELECTRONIC TIMING DEVICE

Curtis Marshall, Baltimore, Md.

Application July 3, 1950, Serial No. 171,808

5 Claims. (Cl. 315—275)

1

This invention relates generally to timer circuits and more particularly to electronic circuits for pulsating control of external or utility circuits.

The principal object of the invention is to provide an automatic self cycling circuit for periodically energizing an external circuit.

A more particular object of the invention is to provide a self cycling circuit including a current responsive device for periodically energizing an external circuit.

A further object of the invention is to provide a self cycling circuit including an electron tube and a current responsive device in which the tube and the device mutually interact to periodically energize an external circuit.

Another object of the invention is to provide a self cycling circuit including an electron tube and a current responsive device in which the mutual interaction of the tube and the device is controlled by suitable predetermined means in order to govern the energization period of an external circuit.

Another object of the invention is to provide a self cycling circuit including a gas filled discharge tube with a control electrode and a current responsive relay in which the tube and the relay mutually interact under the influence of predetermined means controlling the voltage on the control electrode to govern the energization period of an external circuit.

With these and other objects in view, the invention resides in the following specification and appended claims, certain embodiments of which are illustrated by the attached drawings in which:

Figure 1 is a schematic representation of the preferred embodiment of the invention;

Figure 2 is a schematic representation of the invention similar to Figure 1 illustrating the use of batteries for grid voltage supply in lieu of the rectifier arrangement in Figure 1; and Figure 3 is a schematic diagram of a modification of the invention.

Referring more particularly to Figure 2, an electric discharge tube 1 preferably of the thyratron type is shown connected across a source of alternating current potential at 2. A vacuum tube would be used in lieu of the thyratron if a D. C. source of supply were utilized. Interposed in line 3 leading from plate 4 in tube 1 to the A. C. source 2 is a current responsive device 5. The device 5 which may be a simple relay has an inductive winding 6 and switching contactors 7, 8 and 9.

2

A thyratron as is well known in the art is a tube which with A. C. on the plate will conduct during most of the half cycle when the plate is positive and its grid is positive to a critical potential usually just a few volts negative to a cathode potential and will not conduct during the half cycle when the plate is positive and its grid is positive to this critical potential. In Figure 2 the cathode 10 of the tube 1 is shown grounded at 11. The grid 12 is provided with alternate circuits under the control of device 5 to automatically periodically render the grid bias negative and positive to control the conductivity of the tube 1. In Figure 2 the circuit which will after a time interval render the tube conducting is shown controlling the voltage on grid 12. This circuit includes line 13 from grid 12 connected by line 14 through contactor 7 and resistor 15 to the positive side of battery 16. From battery 16 the circuit continues through battery 17 and line 18 from which it is connected by line 19 through contactor 8 of device 5 to condenser 20. The other side of condenser 20 is connected by line 21 to line 13.

The description of Figure 1 may be best understood by the mode of operation, Figure 1 showing a preferred embodiment of the invention. With contactors 7 and 8 in the position shown, i. e., the position assumed with all power off and switch 58 in the position shown, as soon as power is turned on by means of switch 55', plate 22 of condenser 20, which at the moment that all power is turned on is at zero potential in respect to plate 32, and, consequently, negative to the cathode by the voltage across filtering condenser 36, begins to take a positive charge which approaches the total voltage across filtering condensers 35 plus 36 exponentially in time. However, at the time that plate 22 attains sufficient charge to make it barely positive in respect to the cathode or ground or half the total potential available at condensers 35 and 36, the grid 12 of tube 1 which tends to have the same voltage as plate 22 allows current to flow within the plate circuit. This current energizes device 5 and contacts 7, 8 and 9 are moved to the other position such that contacts 24 and 25 are connected and 27 and 28 are connected, all other contacts being disconnected. This switching action effectively disconnects plate 32 of condenser 20 from the negative side of condenser 36 and connects it to the positive side of condenser 35 through point 27. Thus, in respect to the tube cathode 10, plate 22 of condenser 20 is now positive in the sum equal to the potential of the charge across plates 22 and 32 at the time of switching plus the potential across condenser 35 or with condensers 35 and 36 having the same voltage, the plate 22 has then twice the voltage across condenser 35 in respect to ground. The grid 12 actually does not have this high a voltage as, at the moment of start of conduction of the tube, grid current flows between grid 12 and cathode 10. Resistor 37, being of high value, prevents discharge of condenser 20 through that channel but still it is held positive to the cathode due to the internal resistance of the tube, thus maintaining conduction.

At the same time that the switching action of device 5 applies the double positive voltage to grid 12, the closing of the contacts 24 and 25 provides a resistance path through resistor 31 and rectifiers 33 and 34 to discharge plate 22 of condenser 20 not only to zero in respect to plate 32 which would also be positive in respect to cathode 10 by a potential equal to that across condenser 35, but also to continue past this point and to recharge plate 22 in the opposite polarity from the negative source provided by rectifier 34. When plate 22 then reaches a barely negative potential in respect to cathode 10, the tube ceases to conduct and device 5, with associated contacts, returns to its first position under the action of a spring (not shown). This switching action effectively disconnects plate 32 from the positive side of condenser 35 and connects it to the negative side of condenser 36 thus moving the potential at point 13 from approximately zero in respect to the cathode 10 to a value negative to cathode 10 by a value equal to the charge in the condenser plus the voltage across condenser 36. The same switching action places resistor 15 in such a manner that this charge on plate 22 of condenser 20 discharges through resistor 15 and rectifier 33 not only so that no charge remains in condenser 20 but also past this point to recharge in the opposite polarity until point 13 becomes positive enough in respect to cathode 10 to allow tube 1 to conduct and the cycle repeats itself.

Thus it is seen that the period of conductivity of tube 1 is controlled by the resistance value of resistor 31 while the non-conductive period of tube 1 is controlled by resistor 15. Resistor 15 determines the time for condenser 20 to be discharged and recharged positively enough to render grid 12 positive and hence the time the tube will remain non-conductive while resistor 31 determines the time for discharging and recharging the condenser negatively, and hence the time the tube 1 will remain conductive.

A grid resistor 37 is provided in line 13 to minimize current leaking off from grid 12 during the conductive phase. A condenser 38 is shown connected across winding 6 of device 5 to prevent chattering of the relay contactors. A shield 39 is provided in tube 1 to perform its normal function of shielding the control grid from passage of excessive current.

The cycle of operation above described therefore determines the period of engagement and disengagement of contactor 9 with lines 29 and 30 of any external circuit where it is desired to have said circuit engaged and disengaged for definite time intervals. Thus, in essence, two timing intervals are provided with one tube and one condenser, this being an important feature of the invention.

Figure 2 is similar to Figure 1 except that the condenser 20 is charged, discharged, recharged in reverse polarity and discharged alternately by the voltage of batteries 16 and 17. The operation of the circuit is identical to that of the circuit shown in Figure 1.

Figure 3 is a modification of the circuit in Figure 2 and utilizes two condensers 40 and 41 for controlling the voltage on grids 42 and 43, respectively, of tube 44. With the circuit as shown the tube 44 is in a non-conducting condition with contactors 7, 8 and 9 in the lower positions. At this point with A. C. applied to the principal electrodes 45 and 46, the condensers 40 and 41 are being charged by batteries 47 and 48. The upper plate 49 of condenser 40 is rendered positive with respect to ground and since said plate is connected by line 50 to grid 42 through blocking resistor 51, said grid is rendered increasingly positive. Since grid 43 is connected to ground 11 through contactor 8, there is no charge on this grid (even though condenser 41 is charged through resistor 53 to a potential equal to that of battery 48). When grid 42 is rendered sufficiently positive to cause the tube 44 to conduct, winding 6 of device 5 will be energized. When winding 6 is energized, contactors 7, 8 and 9 are moved to the opposite circuit closing positions in the same manner as described with regard to Figures 1 and 2. With the contactors in the new or up position in Figure 3 grid 42 is grounded through contactor 7. Grid 43 is rendered positive with respect to ground by virtue of the voltage on condenser 41. However, simultaneously with switch over of the contactors, both condensers 40 and 41 begin to discharge through resistors 52 and 55 respectively and will continue to discharge until condenser 41 reaches a condition of no charge. (During this time interval, condenser 40 has become rapidly charged through the relatively low resistance of 52.) Thus, when the tube quenching voltage is reached under the control of grid 43 by virtue of the charge on condenser 41, the tube is rendered non-conductive. At this point, the spring (not shown) throws contactors 7, 8 and 9 back to the positions in Figure 3 and the cycle repeats itself as in Figures 1 and 2 to open and close lines 29 and 30 of external circuit for definite periods of time. Resistors 54 and 55 are provided in the circuit in lieu of fixed resistors as in Figures 1 and 2 to show that the charging and discharging times of the condensers 40 and 41 may be varied by varying the resistance values of resistors 54 and 55. These same variable resistors can be used in Figures 1 and 2.

Power supply switches 55', 56 and 57 are provided in circuits 1, 2 and 3 respectively to switch the respective circuits off and on. Switches 58 and 59 are provided in the grid circuits of the electric discharge device in Figures 1 and 2, respectively, to enable the charge on the grid 12 of said circuits to be maintained when the said switches are moved to the opposite position from that shown to stop the cycling action of the circuits in off position. When the switches are returned to the position shown, the cycle will resume. This is the simplest form of cycling interruption control that could be shown, though there are some forty odd combinations of forms—some to stop the cycle in the conducting position, some to stop the cycle in the non-conducting position, and some to resume the cycle in different stages of operation. A somewhat similar switch may be incorporated in the circuit of Figure 3.

Thus it is seen that the invention provides simplified self-cycling circuits for controlling the open and closed periods of an external circuit through the mutual interaction of an electric discharge tube and a current responsive device.

While this invention has been described with reference to specific embodiments of the invention, it is not to be limited thereby save as defined in the appended claims.

I claim:

1. A self cycling timer circuit comprising an electric discharge tube with two control electrodes and two principal electrodes, means to connect a current responsive device in series with one of the principal electrodes, means to apply an alternating potential across the principal electrodes, means to apply direct current potentials to the control electrodes, a condenser connected to each of the control electrodes, a plurality of contactors under the control of the current responsive device to periodically switch connections between each condenser, the control electrode to which it is connected and the source of direct current potential to cause said condensers to be alternately charged and discharged, and variable resistor means connected to each condenser to determine the period of charging and discharging of each condenser and thereby the conductive and non-conductive periods of the tube.

2. A timer circuit comprising an electric discharge tube having a control electrode, a cathode and an anode, means for impressing an alternating potential between said cathode and said anode, a source of direct current potential, a capacitor, means for connecting one terminal of said capacitor to the control electrode of said tube, a pair of resistors, connections for connecting one terminal of each of said resistors to said source of direct current supply, a relay having a winding connected in series with said source of alternating current potential and the anode of said tube, contactors controlled by said relay, and connections between said contactors, and said resistors, and said capacitor and said source of said direct current potential for controlling the polarity of the charge applied to the plates of said capacitor so that the period of conductivity of said tube is controlled by the capacity of said capacitor and the resistance of one of said resistors and the period during which said tube is non-conductive is determined by the capacity of said capacitor and the resistance of the other of said resistors.

3. A timer circuit comprising an electric discharge tube having a control electrode, a cathode and an anode, means for impressing an alternating potential between said cathode and said anode, a source of direct current potential, a capacitor, means for connecting one terminal of said capacitor to the control electrode of said tube, a pair of resistors, connections for connecting one of said resistors to the positive terminal of said source of direct current supply and connections for connecting the other of said resistors to the negative terminal of said source of direct current supply, a relay having a winding connected in series with said source of alternating current potential and the anode of said tube, contactors controlled by said relay, and connections between said contactors, and said resistors, and said capacitor and said source of said direct current potential for controlling the polarity of the charge applied to the plates of said capacitor so that the period of conductivity of said tube is controlled by the capacity of said capacitor and the resistance of one of said resistors and the period during which said tube is non-conductive is determined by the capacity of said capacitor and the resistance of the other of said resistors.

4. A timer circuit comprising an electric discharge tube having a control electrode, a cathode and an anode, means for impressing an alternating potential between said cathode and said anode, a source of direct current potential, connections for connecting said last mentioned source to the cathode of said tube, a capacitor, means for connecting one terminal of said capacitor to the control electrode of said tube, a pair of resistors, connections for connecting one terminal of each of said resistors to said source of direct current supply, a relay having a winding connected in series with said source of alternating current potential and the anode of said tube, contactors controlled by said relay, and connections between said contactors, and said resistors, and said capacitor and said source of said direct current potential for controlling the polarity of the charge applied to the plates of said capacitor so that the period of conductivity of said tube is controlled by the capacity of said capacitor and the resistance of one of said resistors and the period during which said tube is non-conductive is determined by the capacity of said capacitor and the resistance of the other of said resistors.

5. A timer circuit comprising an electric discharge tube having a control electrode, a cathode and an anode, means for impressing an alternating potential between said cathode and said anode, a source of direct current potential, a pair of capacitors connected to said source of direct current, a common connection for connecting said capacitors together and connections for connecting said capacitors to said source of direct current to be charged in opposing polarity, a control capacitor, means for connecting one terminal of said control capacitor to the control electrode of said tube, a pair of resistors, connections for connecting one of said resistors to one of said pair of capacitors and for connecting the other of said resistors to the other of said pair of capacitors, a relay having a winding connected in series with said source of alternating current potential and the anode of said tube, contactors controlled by said relay, and connections between said contactors, and said resistors, and said control capacitor and said pair of capacitors for controlling the polarity of the charge applied to the plates of said control capacitor so that the period of conductivity of said tube is controlled by the capacity of said control capacitor and the resistance of one of said resistors and the period during which said tube is non-conductive is determined by the capacity of said control capacitor and the resistance of the other of said resistors.

CURTIS MARSHALL.

REFERENCES CITED

The following references are of record in the file of this patent:

UNITED STATES PATENTS

| Number | Name | Date |
|---|---|---|
| 1,552,321 | Lea | Sept. 1, 1925 |
| 1,892,017 | Stansbury | Dec. 27, 1932 |
| 2,008,413 | Dawson | July 16, 1935 |
| 2,024,542 | Simon | Dec. 17, 1935 |
| 2,062,616 | Stansbury | Dec. 1, 1936 |
| 2,479,274 | Simons | Aug. 16, 1949 |

FOREIGN PATENTS

| Number | Country | Date |
|---|---|---|
| 408,624 | Great Britain | Apr. 9, 1934 |